United States Patent Office 3,453,096
Patented July 1, 1969

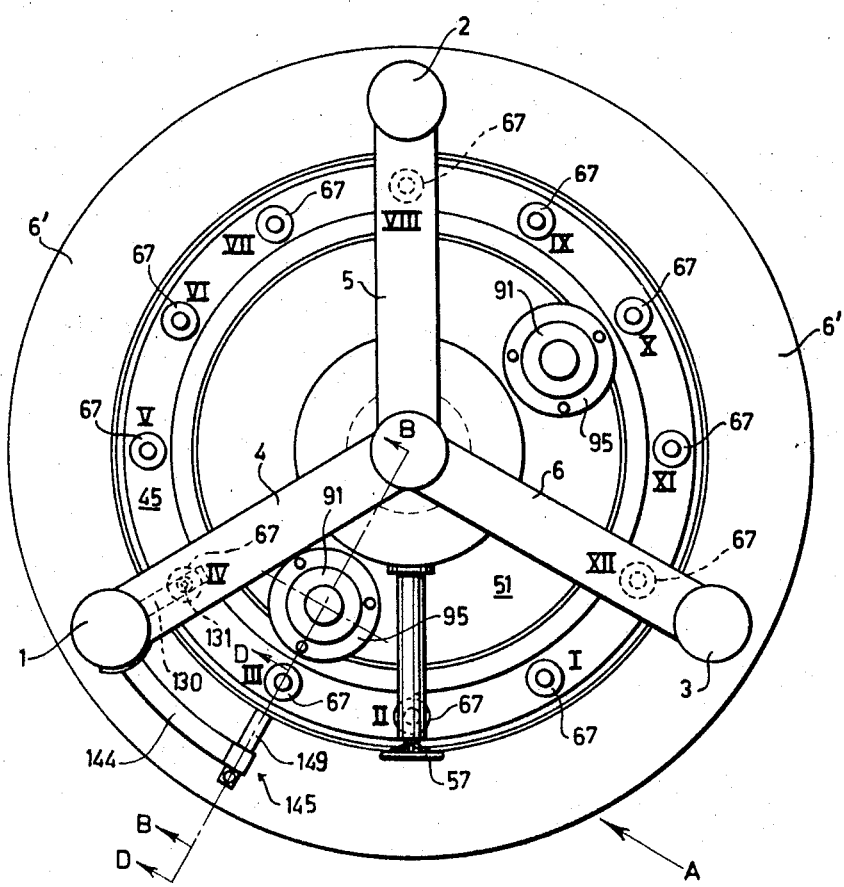

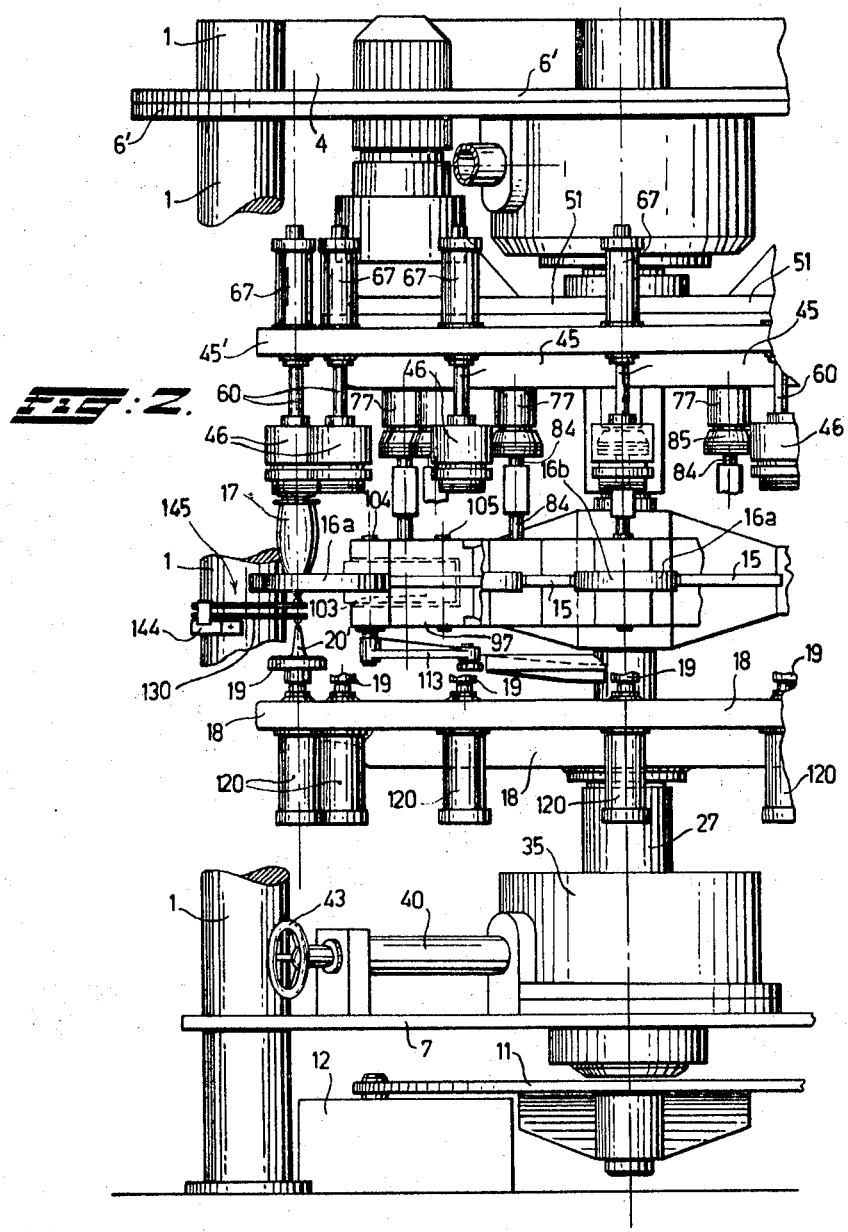

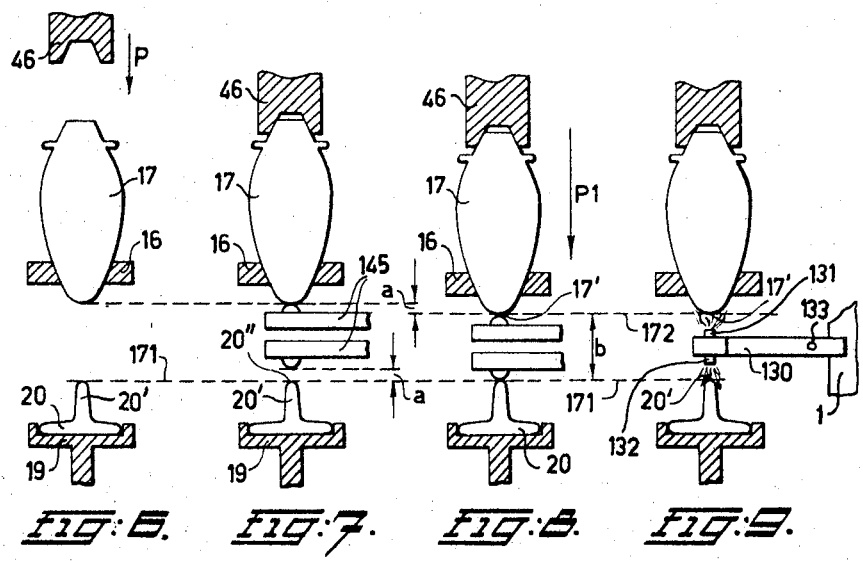
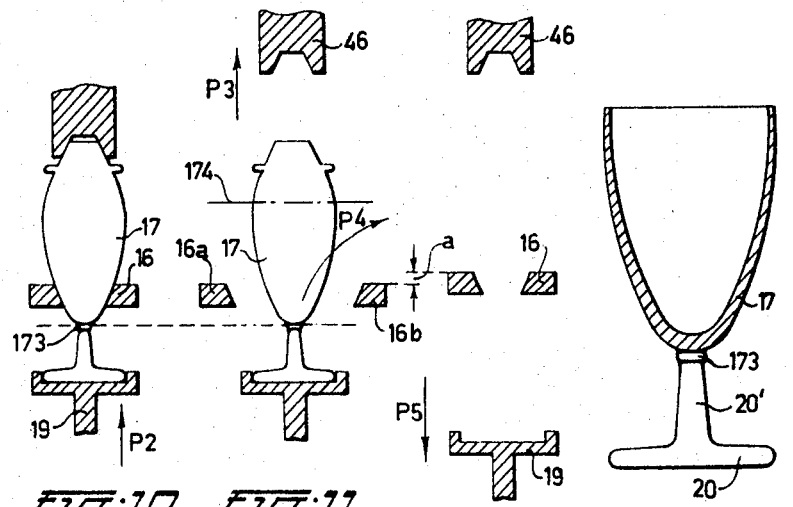

3,453,096
METHOD AND DEVICE FOR THE PRODUCTION OF GLASS FOOTED STEMWARE
Emil J. J. Benard and Gerrit de Leeuw, Leerdam, Netherlands, assignors to N.V. Vereenigde Glasfabriken (United Glassworks), Schiedam, Netherlands, a limited-liability company of the Netherlands
Continuation-in-part of application Ser. No. 57,347, Sept. 20, 1960. This application June 25, 1965, Ser. No. 467,056
Int. Cl. C03b 23/20
U.S. Cl. 65—54                                8 Claims

ABSTRACT OF THE DISCLOSURE

Glass stemware is mass produced from prefabricated bowls and prefabricated foot and stem assemblies, the stemware being of a quality higher than obtainable heretofore by mass production. The bowl and stem are axially aligned and spaced so that the bottom of the bowl and the top of the stem are exactly a predetermined distance apart and after the bottom of the bowl and the top of the stem are heated above the weakened temperature they are moved axially toward each other a predetermined distance greater than the first mentioned distance to join the stem and bowl.

---

This is a continuation-in-part of application Ser. No. 57,347 filed Sept. 20, 1960, and now abandoned.

The invention relates to a method for the mass production of high quality glass footed stemware, in which parts of the glass article are fabricated separately and subsequently joined.

The invention further relates to a device for joining prefabricated parts of glass articles.

In attempts to realize an automatic production of glass footed stemware it has until now been a problem not satisfactorily solved, to join premanufactured parts thereof in a manner by which the esthetic qualities of the chalices are not affected, at the same time allowing the separate manufacture of the component parts by automatic methods, such as by moulding them in automatic machinery.

It is an object of the invention to escape from the restrictions as to the shaping of the article and to arrive at a method offering greater freedom to the designer.

It is a further object of the invention to premanufacture a body portion having a regularly rounded underface, avoiding any prolongation or stem portion thereon as a premanufactured part thereof. Such a purely balloon shaped bowl portion can be easily produced on the blow pipe or in a balloon blowing machine.

Most surprisingly it has appeared that the outer wall of such a balloon or drop shaped body is extremely suitable for the formation of a joint at the location where the axis passes through the bottom. The foot is now separately produced together with the entire length of the stem and the joint spot has become almost invisible, so that a dimensioning by extension after the jointing process is in general superfluous.

Other objects of the invention, and the manner in which it is to be performed will hereinafter be described in detail, with reference to the accompanying drawing.

Figure 2A:
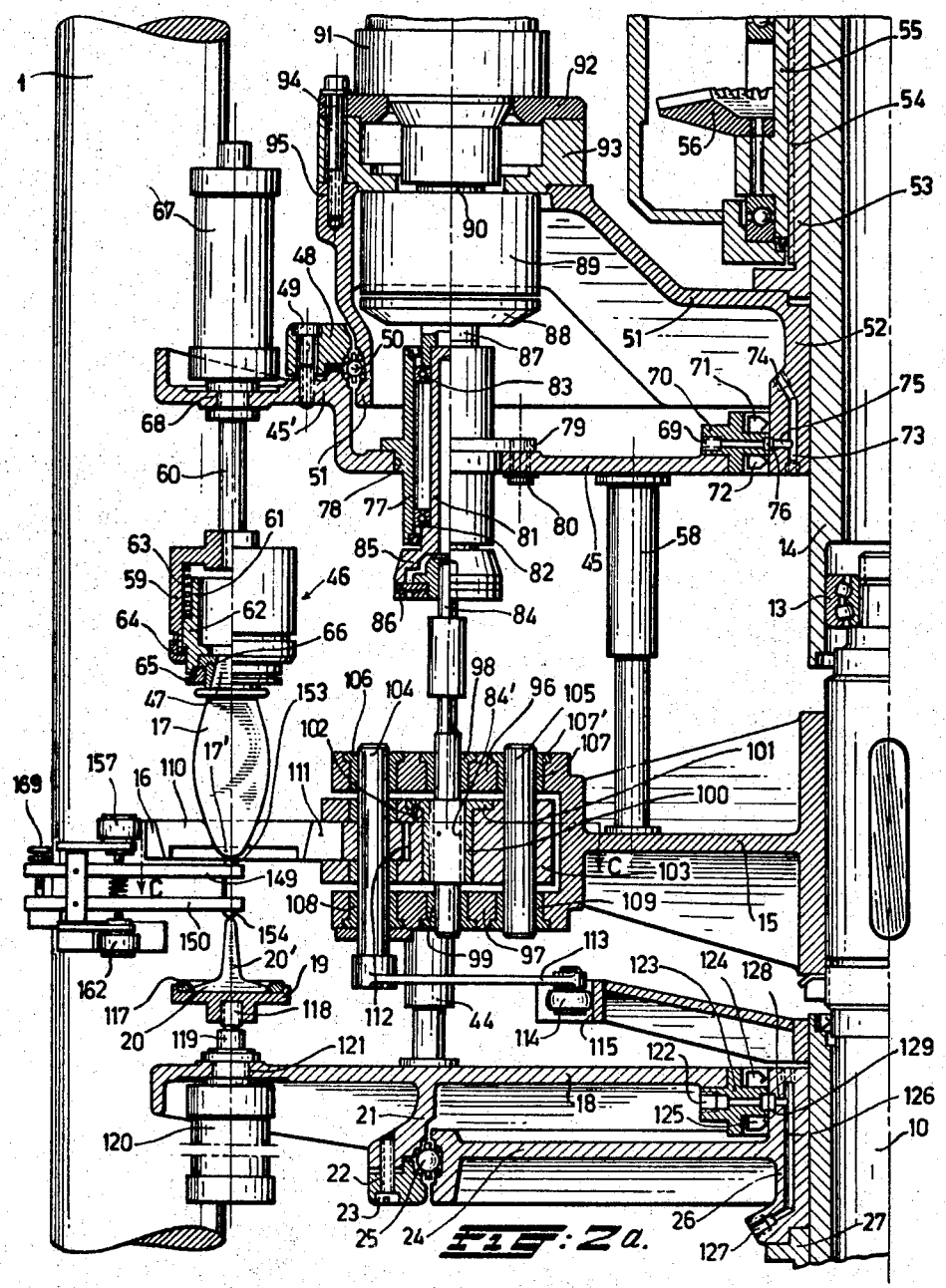
Figure 3:
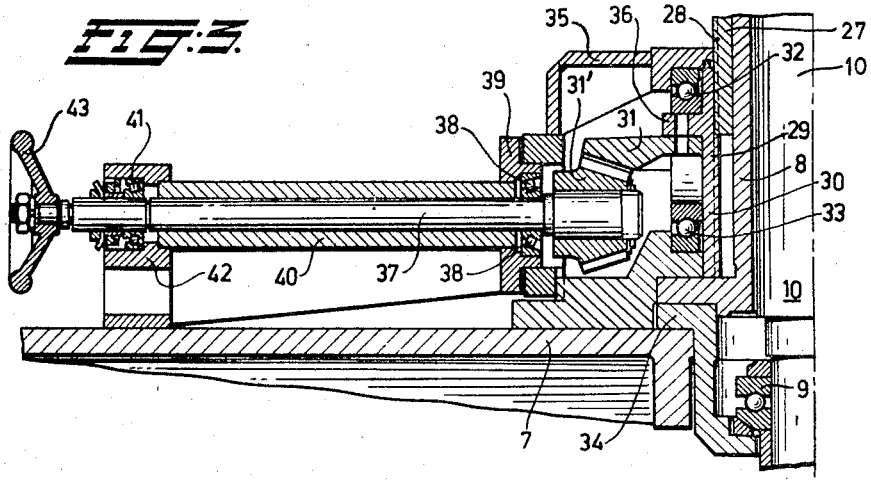
Figure 4:
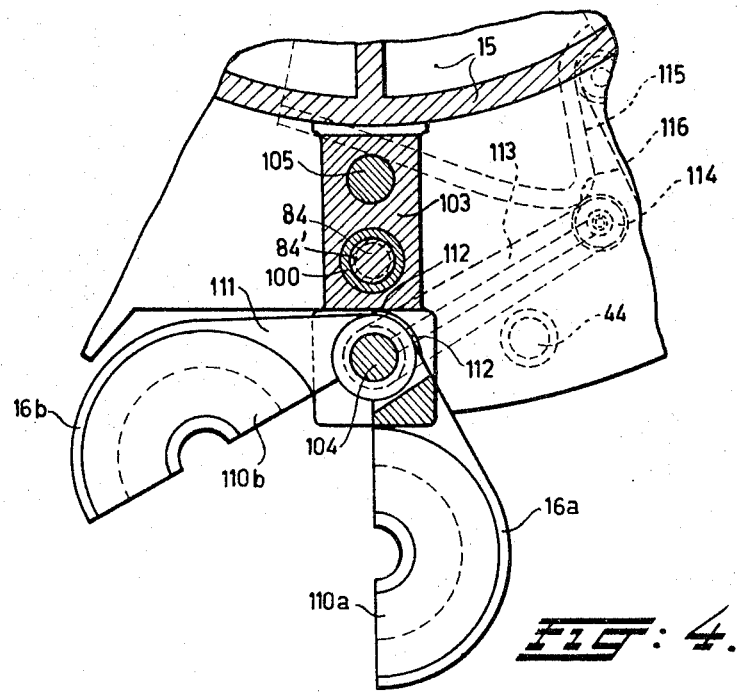
Figure 5:
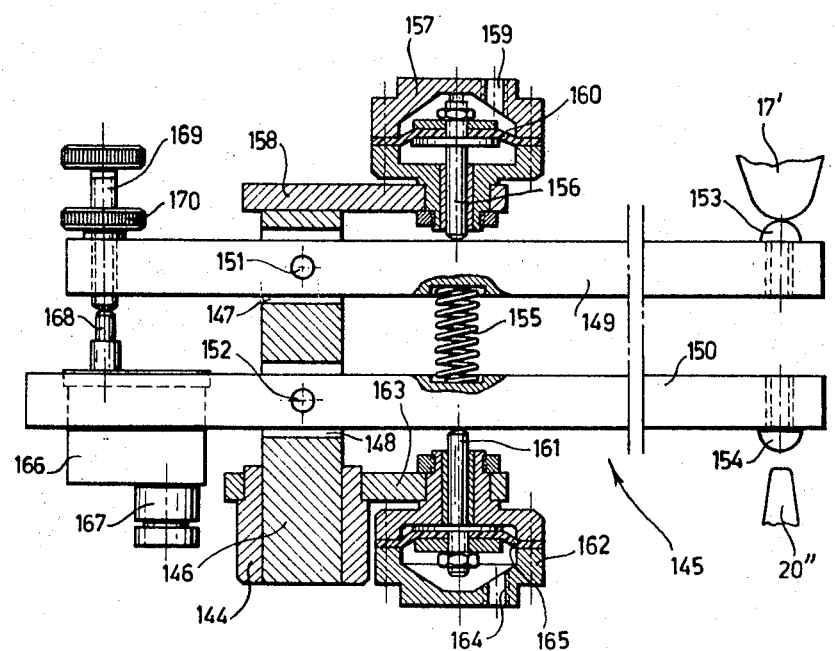

In the drawing:
FIGURE 1 is a plan view of one form of apparatus wherein our invention can be practiced;
FIGURE 2 is an elevation according to the arrow A of FIGURE 1;
FIGURE 2a is a partial vertical section on the line B—B of FIGURE 1;
FIGURE 3 is an axial section of a lower portion of the machine at the location of station II in FIGURE 1;
FIGURE 4 is a horizontal section on the line C—C of FIGURE 2a;
FIGURE 5 is a partial vertical section on the line D—D if FIGURE 1;
FIGURES 6–12 inclusive illustrate diagrammatically the successive operation steps of the machine;
FIGURE 13 shows in elevation a stemmed and footed glass article in its final shape, the bowl portion being represented in section.

According to the invention the bowl portion is prefabricated separately in any appropriate production manner, for example in an automatic blowing machine. The bowl portion with the moil still united therewith, is supplied to a joining machine. Further to the joining machine prefabricated parts are supplied, consisting of a foot and the entire stem portion.

Referring to FIGS. 1–3 inclusive, the operating parts of the joining machine are mounted on a machine frame, comprising three vertical standards 1, 2, 3, which rest on the floor, interconnected at their upper ends by horizontal frame members 4, 5, 6, 6′ and at a certain distance from the floor by a base plate 7, which may be of circular shape. Centrally on the base plate 7 a stationary tube 8 is arranged, provided with a bearing 9 for the spindle 10 which extends through the tube. The lower end of the spindle 10 projects below the base plate 7 and is driven for intermittent rotation by any conventional driving means 11, 12, whilst the upper end of the spindle 10 is bearing as at 13 in the lower end of the central upper tube 14 supported from the horizontal frame members 4, 5, 6.

Between the lower and upper bearing tubes 8 and 14 the substantially circular table 15 is affixed to the spindle 10, which can thus intermittently be rotated. Along the circumference of the circular table 15 a plurality of substantially radially extending holders 16 is arranged for support of the bowl or body portion 17 of the glass article to be treated.

Below the table 15 the lower circular table 18 is rotatably arranged, for support along its circumference of a plurality of small tables or chucks 19 upon which the feet 20 of the glass articles are to be placed. The table 18 is provided at its underside with an annular flange 21 and a ring 22 connected e.g. by bolts 23, between which flange and ring and the circular plate 24 the annular ball bearing 25 is arranged. The plate 24 is a horizontal extension of a bushing 26 which fits around and is slideable along the stationary tube 8 and which is fixedly connected to a lower bushing 27, similarly slideable along the tube 8, and provided with outer thread 28. The latter thread corresponds with inner thread 29 in a tube 30, provided with a bevel gear 31, so that when this gear is rotated, the bushings 26 and 27, the plate 24 and the lower table 18 with the article foot supporting means 19 can be raised and lowered.

FIGURE 3 shows that the threaded tube 30 is guided by two ball bearings 32, 33 with respect to a flange 34 of the stationary tube 8 resting upon the base plate 7, and with respect to the gear case 35. The tube 30 is further provided with an annular flange 36 for support of the bevel gear 31. The bevel gear 31 cooperates with a second bevel gear 31′ at the end of a spindle 37, bearing at 38 in the closure ring 39 of the gear case, extending through the tube 40, supported at its other end by a bearing 41 in the bracket 42 which rests upon the base plate 7, and having a handwheel 43, which is thus the control means for the adjustment of the lower table 18.

The lower table 18 will follow the intermittent rotational movement of the table 15 by the provision of a number of vertical bars such as 44, which are executed telescopingly in view of the varying vertical position of the lower table 18. For better clearness these bars 44 are omitted in FIGURE 2, and only visible in FIGURES 2a and 4.

In similarly manner above the table 15 an adjustable circular table 45 is rotatably mounted. Its raised circumferential region 45' bears the means 46 for gripping the top part or moil 47 of the glass body portion 17 and it is provided with a ring 48, fixed thereto as by bolts 49 for keeping the annular ball bearing 50 placed against the ring shaped flange 50, 51' of the adjustment plate 51. The adjustment plate 51 forms an extension of the bushing 52, fixedly connected to the upper bushing 53, both bushings being slideably along the stationary upper tube 14, and the upper one being provided with outer thread 54 which corresponds with inner thread in the tube 55 and by which vertical adjustment can be obtained when rotating the bevel gear 56 by means of an upper handwheel mechanism 57 similar to the mechanism described with reference to FIGURE 3 for the lower table adjustment. The upper table 45 is taken along in intermittent rotation again by a number of telescoping vertical bars 58 affixed to the driven middle table 15, similarly not represented in FIGURE 2, but only in FIGURE 2a.

The means for gripping the top part or moil 47 of the glass body 17, to keep the glass body in upright position when its lower end is positioned in the holder 16, comprises a cylindrical housing 59 open at its lower end and affixed to the lower end of a vertical spindle 60, an inner cylinder 61 provided with an annular flange 62 fitting within the housing 59 and cooperating with the compression spring 63, a threaded ring 64 screwed onto the lower end of the housing 59 for securing the cylinder 61, a second threaded ring 65 screwed onto the lower end of the cylinder 61 as clamping means for the resilient ring 66 which has an inner shape corresponding to the shape of the moil 47. The glass body 17 is thus fixed elastically between the holder 16 and the resilient ring 66 when the spindle 60 is lowered. The upward and downward movement of the spindle 60 is controlled by the pneumatic cylinder 67, which may be of any well-known type, mounted in a threaded bore 68 of the upper table 45.

Pneumatic pressure may be supplied to the cylinder 67 by a tubing not representing, which is connected to a lateral bore 69 in the central boss 70 of the upper table 45, where the table is guided in its rotation about the adjustable bushing 52, and where seals 71, 72 are provided. The latter bushing has a borehole 73 in axial direction, being provided with means 74 for the supply of pressure, and to which the radial bore 75 is connected. The bore 75 further links up with the circumferential groove 76 in front of the bore 69 and extending along the bushing 52 over an angle corresponding to the angle of the rotating table over which the cylinder 56 needs pneumatic pressure, as will appear from the following description of the device.

A vertical tube 77 is mounted through a bore 78 of the upper table 45 and affixed therein by means of an annular flange 79 and bolts 80. Inside the tube 77 a hollow spindle 81 is guided by bearings 82, 83, the spindle being connected at its lower end to a spindle 84 by intermediary of an appropriate coupling 85 which may comprise a resilient ring 86—and at its upper end by short intermediate shaft 87 bearing the member 88, which constitutes a half of an electro-magnetic coupling.

The other half 89 of the electro-magnetic coupling is mounted on the upper adjustment plate 51. It is suspended from and energized through the shaft 90 of the electric motor 91 mounted by spacing rings 92, 93 and bolts 94 on a raised portion 95 of the plate 51.

The spindle 84 may thus be rotated when the electric motor 91 rotates and this rotation serves the adjustment of the vertical portion of the holder 16, as follows. The rotatable table 15 is executed near its circumference, in the shape of a horizontal U, to form in the legs 96, 97 a double support for the spindle 84 where bushings 98, 99 are acting as slide bearings. The portion 84' of the spindle 84 between the legs 96 and 97 is provided with thread, cooperating with inner thread in the tube 100, which is provided with a flange 101 for fixing it as by screws 102 into a bored block 103. The block 103 is further guided by two pins 104, 105, which are bearing in bushings 106, 107, 108, 109 in the legs 96, 97.

The height of block 103 is smaller than the distance between the legs 96, 97 of the U-shaped table portion, so that vertical adjustment of the block 103 is allowed when the spindle 84 is rotating under influence of the electric motor 91, whereby the holder 16, which is supported by the block, is also adjusted vertically.

The holder 16 comprises two halves 16a and 16b respectively, as is visible from FIG. 4, each half having an exchangeable half inner ring 110a, 110b resp., the inner circumference of which is shaped so as to be adapted to the shape of the lower bowl portion 17 which has to be supported by it. The half 16a of the holder is united with the adjustable block 103, the other half 16b has an arm 111 extending in central direction of the table being fixed to the pin 104 and fitting within a space 112 saved in the block 103, being so shaped as to permit a swinging movement of the arm and holder part over an angle of about 60°.

The swinging movement of the holder part is effected by rotation of the pin 104, inside the bushing 104'. The pin 104 has, affixed to its lower protruding end a link 113 which follows by means of a roller 114 a cam groove 115 stationary with the lower central tube 8. When the cam groove 115 has a great radial distance to the central axis of the device, for example at 116 in FIGURE 4, the holder will be opened.

The chuck 19 may be provided with an upstanding rim 117 for the centering of the stem and foot 20 of the glass article to be treated. The chuck is screwed as at 118 on the top of the spindle 119 of the lower pneumatic cylinder 120 which is mounted in a threaded bore 121 of the lower table 18. Pneumatic pressure may be supplied to the cylinder 120 by a tubing, not represented, connected to the lateral bore 122 in the boss 123 which guides the table 18 in its rotation about the adjustable bushing 26 sealing means 124, 125 being provided at that location. Bushing 26 has a borehole 126 in axial direction with means 127 for the supply of pressure and to which the radial bore 128 is connected. The bore 128 links up with the circumferential groove 129 in front of the bore 122 and, similarly as described with regard to the control means for the upper pneumatic cylinder, extending along the circumference of the bushing 26 over so great an angle that pressure is supplied through the bore 122 during the rotation of the table 18 as long as necessary to energize the pneumatic cylinder 120.

Fixed with respect to the machine frame, for example mounted on the vertical standard 1, as is visible from FIGURE 9, is a burner arm 130, at a height intermediate the holder 16 and the chuck 19, having a burner 131 directed vertically against the lower bowl portion 17', and a burner 132 directed downwardly to the top 20'' of the stem and foot portion 20. Gaseous fuel is supplied simultaneously to both burners through the schematically represented supply member 133.

The horizontally extending bracket 144 mounted on the same vertical standard 1, supports the feeler mechanism 145, the purpose of which is to adjust the distance of the locations on the bowl 17' and stem 20'' which are to be jointed. FIGURE 5 shows that on the bracket 144 the column 146 is mounted, being provided with spaced, horizontal holes 147, 148 each wide enough to allow for a slight swinging movement of the normally horizontal feeler arms 149 and 150 respectively around the horizontal swing bolts 151, 152. On its front end the feeler arm 149 supports the feeler pin 153 and coaxially a downwardly directed feeler pin 154 is mounted at the end of the arm 150. At a short distance from the swing bolts, at the same side as the feeler pins, the spring 155 is interposed between the feeler arms 149 and 150.

The highest position of the upper feeler arm 149 is determined by the pin 156 of the pneumatic control element 157 which is supported by the bracket 158 on the top end of the column 146. When no pressure is supplied through the inlet 159 behind the membrane 160, the pin 156 and the arm 149 are forced upwardly under the influence of spring 155. Normally an upwardly directed force is exerted on the spring, as the pin 161 of the lower pneumatic control element 162, supported by the small bracket 163 on the bracket 144, is pressed upwardly by pressure supplied through the inlet 164 behind the membrane 165.

In the rear end of the lower feeler arm 150 is disposed an electric switch 166, for example a microswitch with wire inlet 167 and upwardly protruding actuation pin 168. The higher feeler arm 149 is provided with an adjusting screw 169 with locking nut 170, which screw is coaxial with the switch actuator 168, so that at a chosen distance of the feeler arm end, i.e. at a certain angular relation between the feeler arm 149 and 150, an electric signal can be obtained.

The position of the feeler arms represented in FIGURE 5 is the initial position, in which the glass bowl portion and the stem and foot, arranged on rotating tables, are supplied to the feeler mechanism 145. The vertical position of the feeler mechanism 145 with respect to the holder 16 is such that the lower end 171 of the bowl position, lying in the holder 16 which is assumed to have its highest position as determined by the adjustable block 103, will arrive immediately above the upper feeler pin 153. For various article shapes to be treated, this may be obtained by appropriate choice of the shape of the inner holder ring 110, more specifically the shape and dimensions of the inner circumference. Initially the chuck 19 controlled by the pneumatic cylinder 120, is in its lowermost position.

The actuation of the pneumatic control elements 157 and 162, to have them function as required by the glass bowls and feet on the rotating tables successively passing the feeler mechanism, may be derived in simple and well known manner by an electric or pneumatic timing mechanism, which may be synchronized with respect to the rotating tables by the provision of means such as cams or electric switches, appropriately positioned thereon.

In the above it was stated that the various tables of the machine are rotating intermittently. More particularly, FIGURE 1 shows that a complete cycle comprising twelve stops, indicated with the numerals I–XII, so between successive stops the rotatable parts are displaced over an angle of 30°. For this reason the following machine parts described are provided twelve times equidistantly around the rotatable tables: the chuck 19 with pneumatic cylinder 120 and connection to a lateral bore 122, the bowl holder 16 with opening link 100, adjustment block 113, adjustment spindles 81 and 84, lower part of coupling 88, moil gripping means 46 with pneumatic cylinder 67 and connection to a lateral bore 69.

Electric motors 91 with upper parts 89 of the electromagnetic coupling on raised portions 95 of the plate 51 are only provided at sections III and X.

The operation of the machine will now be described, following the way of one workpiece along the successive stations, with reference to FIGS. 6–12 inclusive, which schematically represent the steps of treatment.

At station I a foot portion 20 prefabricated in a moulding machine and provided with an integrally manufactured stem 20', is placed on the supporting table or chuck 19.

At station II a balloon or bowl 17, prefabricated in an automatic blowing machine is placed into the holder 16, which is closed then, FIG. 6. Insertion of the bowl portion and of the stem and foot portion may be done either manually or by mechanical article handling means which are known in the art.

Still at station II, the moil gripping means 46 according to the arrow P is moved downwardly by actuation of the pneumatic cylinder 67, until said means presses the bowl portion 17 on the holder 16.

Arriving at station III, FIG. 7, the double armed feeler mechanism 145 is presented between the upper end 20" of the stem 20' and the lower end 17' of the round bottom of the bowl portion 17. While the chuck 19 remains in a fixed place, the top of the stem or the joint surface 20" being at the level of the dotted line 171, the lower portion of the coupling 88 has arrived below the upper portion 89, rotated by the motor 91, causing the block 103 wtih the holder 16 to move downwardly. Simultaneously the lower feeler arms 150 is freed by the lower pneumatic control element 162. The arrow P1 in axial direction indicates the downward movement of the holder 16 with bowl 17, until the motor 91 is stopped by the electric signal from the switch 166 in the feeler mechanism 145, which effects that the lower end 17' of the receptacle 17, i.e. the joint end thereof, is exactly adjusted on the distance $b$ between the dotted lines 171 and 172. The correction of height is thus automatically effected, at the given event on the distance $a$ determined by the feeler device in order to adjust the desired distance $b$, as indicated in FIG. 8. Finally at station III, both pneumatic control elements 157 and 162 are actuated, so as to free them from the adjusted glass portions, whereupon these may go over to position IV. Immediately thereafter the upper control element 157 is set free again to be ready for the next cycle.

According to FIG. 9 between the joint ends 20" and 17' there is presented the burner 130 at station IV, the position of the burner and the delivery of heat of the flames being defined in such a way that the area of both joint spots mentioned is brought to the desired degree of softness.

As indicated in FIGURE 10 by the arrow P2 at station V the chuck 19 is axially conducted by actuation of the lower pneumatic cylinder 120, over an exactly predestined distance towards the holder 16, said distance being somewhat greater than the distance $b$, in such manner that both joint faces 20" and 17' merge so as to form a single joint 173 directly on the underside of the bowl portion 17, whereby, as a result of the even shaping of the outer wall of the bowl and the tolerance observed on production for the shaping of the head of the stem, it is achieved that the quantity of glass which is displaced during the formation of the joint is determined to a sufficiently exact degree in order to allow for obtaining the desired circumferential shape on the joint spot.

If desired the program of the pneumatic chuck control may be executed so as to produce a slight withdrawal of the foot and stem portion after formation of the joint, in order to diminish the size of the joint ring. When this is done, the chuck 19 must be a vacuum chuck of known construction.

After formation of the joint at station V, cooling may take place at stations VI, VII and VIII. At any of these stations, preferably at VIII, the moil gripping means 46 may be loosened, arrow P3 in FIG. 11, by taking away the actuating pressure on the pneumatic cylinder 67.

At station IX the holder 16a, 16b is opened and the completed workpiece taken away, either manually or mechanically, as indicated by the arrow P4.

Further at station X, FIG. 12, the chuck 19 is lowered by the pneumatic cylinder 120, the holder 16 is closed again, whilst an electric motor 91 with upper half of electro-magnetic coupling 89 provided at this station, causes the holder 16 to return to its initial higher position.

Stations XI and XII finally may be used in known manner for cleaning the various parts and for preheating them to be ready for the next cycle starting at station I.

FIGURE 13 shows to an enlarged scale the chalice realized after the upper part or moil of the body portion, which during the proceedings described hereinbefore has served for holding and directing the object to be operated upon is removed according to the dot-dash line 174 indicated in FIGURE 6, according to any one of the known methods. The bowl portion 17 of the chalice remains with the stem 20' and the foot 20 connected therewith.

As described, a small joint ring serving as a decorative edge may remain, the dimensions of which are also determined by the above means in such a way that they are exactly reproducible. The fact that on the formation of the joint one has only to do with a single stem or leg whereas the other joint spot constitutes a portion of the outer wall of a cup shaped body portion, contributes to the formation of a joint which has no disturbing effect. Moreover the advantages are obtained, viz that the configuration of the surface of the stem 20', which for instance is constituted by providing facets, proceeds on the entire height of the stem of the glass chalice without giving rise to a disturbing interruption of such facets in the place of the joint connection. The facets may also proceed without interruption on the foot 20.

It has been proven in practice, that in this way chalices can be automatically produced at a minimum of losses, the said chalices as to eye appeal and quality not being inferior to chalices which are made according to tried methods developed throughout the ages, in which, however, a good deal of manual labour was indispensable up till now.

It will be clear that the method for the production of stemware wherein one part consists exclusively of a bowl and another part consists of a foot with the entire stem integrally joined thereto, and wherein these prefabricated parts are subsequently joined, after adjusting them at a predetermined distance between the locations to be connected, may be realized in a machine not only different from the above described machine in certain details, but also in machines of entirely different type such as those which have no rotating tables, but wherein the article parts to be joined are stationary, the steps of treatment being executed by supplying parts such as a feeler and a burner to the stationary glass parts. It is for this reason that we do not want to be limited further than we are limited by the scope of the appended claims.

What we claim is:

1. A method for the mass production of high quality glass footed stemware comprising the steps of separately prefabricating a first glass part consisting exclusively of a hollow bowl defining body and a second glass part constituting a foot with the entire stem integrally joined thereto, axially aligning said first and second parts with said stem spaced from the bottom of said body, adjusting said first and second parts axially relative to each other to provide an exactly predetermined distance between said bottom of the body and the upper end of said stem, simultaneously heating only said bottom of the body and said upper end of the stem above the weakening temperature of the glass from which said first and second parts are fabricated, and moving the first and second parts axially toward each other an exactly predetermined distance greater than the first mentioned distance so that said heated upper end of the stem is pressed against said heated bottom of the body to form a joint connecting said first and second parts and which is disposed immediately against said bottom of the bowl defining body.

2. A device for joining separately prefabricated glass parts in the mass production of high quality glass footed stemware comprising, coaxial holder or chuck means for each of the parts, means for providing a predetermined distance between the locations to be joined, a burner insertible for simultaneous heating of the locations to be joined, and means for displacing the holder or chuck means axially toward each other a predetermined distance greater than the first mentioned distance.

3. A device for joining glass parts in the mass production of high quality glass footed stemware comprising, a chuck for the support of a prefabricated foot and stem part, coaxially with said chuck a two-part holder provided with a central opening for support of the bottom region of a bowl defining body part, means for providing a predetermined distance between the top of the foot and stem part and the bottom of the bowl defining body part, a burner insertable for simultaneous heating of the top of the foot and stem part and the bottom of the bowl defining body part, and means for displacing the holder or chuck means axially toward each other a predetermined distance greater than the first mentioned distance.

4. A device as in claim 3, wherein a feeler mechanism is provided for adjusting the glass parts at said first mentioned predetermined distance prior to the heating and axial displacement thereof.

5. A device for joining separately prefabricated glass parts in the mass production of high quality glass footed stemware comprising, holder or chuck means for each of the parts mounted on an intermittently rotatable table member, stationary means for providing a predetermined distance between the locations to be joined, a stationary burner for simultaneous heating of the locations to be joined and means mounted on the table members for displacing the holder or chuck means axially toward each other a predetermined distance greater than the first mentioned distance.

6. A device for joining glass parts in the mass production of high quality glass footed stemware comprising three concentrically table members, simultaneously intermittently rotatable, one of which is provided with chuck means for the support of a first glass part, the second provided with holder means for one end of the second glass part and the third provided with means for gripping the top portion of said second glass part, said chuck and holder and gripping means being coaxially displaceable relative to each other, stationary means for providing a predetermined distance between locations on the two glass parts to be joined, a stationary burner for simultaneous heating of the locations to be joined, and means for displacing the chuck means toward the holder and gripping means a predetermined distance greater than the first mentioned distance.

7. The device defined in claim 3 further comprising means coaxial with said chuck and said holder for gripping the top portion of the bowl defining body part.

8. The device defined in claim 7 further comprising means axially displacing said holder and said gripping means toward said chuck to provide said first mentioned predetermined distance.

References Cited

UNITED STATES PATENTS 2,447,569   8/1948   Eisler _____ 65—152

FOREIGN PATENTS 1,040,708   10/1953   France.

DONALL H. SYLVESTER, *Primary Examiner.*
ROBERT L. LINDSAY, *Assistant Examiner.*

U.S. Cl. X.R.

65—57, 156, 271